United States Patent
Gundlach et al.

(10) Patent No.: US 6,782,747 B2
(45) Date of Patent: Aug. 31, 2004

(54) CAPACITIVE FILL LEVEL MEASURING INSTRUMENT

(75) Inventors: Jochen Gundlach, Tettnang (DE); Werner Hoch, Langenargen (DE); Jaromir Palata, Friedrichshafen (DE)

(73) Assignee: i f m electronic GmbH, Essen (DE)

( * ) Notice: Subject to any disclaimer, the term of this patent is extended or adjusted under 35 U.S.C. 154(b) by 0 days.

(21) Appl. No.: 10/361,021

(22) Filed: Feb. 10, 2003

(65) Prior Publication Data

US 2004/0011128 A1 Jan. 22, 2004

(30) Foreign Application Priority Data

Feb. 8, 2002 (DE) .......................................... 102 05 445

(51) Int. Cl.$^7$ ............................................. G01F 23/26
(52) U.S. Cl. .................................. 73/304 C; 73/290 R
(58) Field of Search ........................... 73/304 C, 290 R

(56) References Cited

U.S. PATENT DOCUMENTS

2001/0037680 A1 * 11/2001 Buck et al. ................ 73/304 C

FOREIGN PATENT DOCUMENTS

| DE | 197 01 899 C2 | 10/1997 |
| DE | 196 44 777 C1 | 6/1998 |
| DE | 197 44 152 A1 | 4/1999 |
| DE | 100 51 292 A1 | 5/2001 |
| DE | 198 13 013 A1 | 5/2001 |
| DE | 100 08 093 A1 | 11/2001 |

* cited by examiner

*Primary Examiner*—Hezron Williams
*Assistant Examiner*—Rodney T. Frank
(74) *Attorney, Agent, or Firm*—Nixon Peabody LLP; David S. Safran

(57) ABSTRACT

A capacitive fill level measuring instrument includes a fill level sensor having several sensor arrays (1), electrical lines (2) connected to the sensor arrays (1), select switches (4) with multi-pole sides (3) connected to the lines (2), and a power supply and evaluation circuit (8) having a power supply circuit (6) and an evaluation circuit (7) connected to the mono-pole sides of the select switches (4). A measured value is determined for a state in which no sensor array (1) is connected via the evaluation circuits (7) and (8), the sensor arrays (1) are alternately connected to the multi-pole side (3) of the first select switch (4) and the multi-pole side (3) of the second select switch (4), and after a first fill level determination, the sensor arrays (1), adjacent to a boundary layer, are triggered or interrogated, advantageously, solving various problems with background art devices.

16 Claims, 3 Drawing Sheets

CAPACITIVE FILL LEVEL MEASURING INSTRUMENT

BACKGROUND OF THE INVENTION

1. Field of the Invention

The present invention relates measuring instrumentation, and more particularly to a capacitive fill level measuring instrument.

2. Description of Related Art

Capacitive fill level measuring instruments (e.g., as further described in published German patent application 100 08 093, and German Patent 196 44 777) are used for capacitive detection of the fill level of liquids, bulk materials, or other fillers, etc., in a closed or open container. Such capacitive fill level measuring instruments operate under the principle that the level to be measured of the filler affects a capacitance between a reference electrode and a fill level sensor or sensor array, due to the difference between the dielectric constant of the filler and that of air.

Accordingly, such capacitive fill level measuring instruments include a power supply, an evaluation circuit, and a fill level sensor having several sensor arrays. The sensor arrays of the fill level sensor are connected to the power supply and evaluation circuit. Electrical lines are used connect the sensor arrays to a multi-pole side of a select switch and to connect a mono-pole side of the select switch to the power supply and evaluation circuit. The select switch therefore includes a plurality of terminals on the multi-pole side and one terminal on the mono-pole side, making it possible to electrically connect a selected terminal of the multi-pole side to the terminal of the mono-pole side or vice versa.

The power supply circuit supplies the necessary voltage and current to the fill level sensor and evaluation circuit. The evaluation circuit determines the level of the filler based on which of the sensors of the sensor array are still to be reached, have already been reached, are no longer being reached, etc., by the filler. The sensors of the sensor arrays of the fill level sensor can be located on top of one another, next to one another, and/or overlapping on top of one another, etc.

The select switch can employ an analog or digital multiplexer or MUX function (compare, German Patent 196 44 777) for providing a power supply function, wherein the power supply and the evaluation circuit can be connected from the terminal of the mono-pole side to one of the terminals of the multi-pole side, and an evaluation function, wherein a sensor of the sensor array can be connected via the terminal of the multi-pole side and a terminal of the mono-pole side to the power supply and evaluation circuit. Accordingly, such a select switch electrically connects a selectable terminal of the multi-pole side to the terminal of the mono-pole side and vice versa, wherein a voltage value or value proportional to the voltage value at the selected terminal of the multi-pole side appears at the terminal of the mono-pole side.

The capacitive fill level measuring instrument described in published German Patent Application 100 08 093 includes various optional measurements that can be implemented in embodiments of the present capacitive fill level measuring instrument. Further, in addition to the sensor arrays located on top of one another, on one side or both sides, there can be a matrix of horizontally and vertically running conductor paths, wherein each horizontally running conductor path is connected on one side to a sensor array and on the other side to the vertically running conductor path, the horizontally running conductor path with the vertically running conductor path to which it is connected forming an electrical line or part of an electrical line.

Capacitive fill level measuring instruments can be classified as open electronic systems, wherein the sensor surfaces of the fill level sensor cannot be completely shielded and, thus, can release electromagnetic radiation and signals into a vicinity thereof, and, conversely, can pick up electromagnetic radiation and signals from the environment, resulting in undesirable electrical interference. This is especially problematic in capacitive fill level measuring instruments, wherein the distance between the sensor elements of the fill level sensor, and the power supply and evaluation circuit can be considerable.

As noted above, capacitive fill level measuring instruments operate under the principle that the level to be measured of the filler affects the capacitance between the reference electrode and a fill level sensor or sensor array, due to the difference between the dielectric constant of the filler and that of air. However, the relative dielectric constant of air is about 1.00055, while the relative dielectric constant of water is about 80.3, and that of oil is about 2.2. Accordingly, determining the level of various types of fillers having widely varying dielectric constants can prove problematic to conventional capacitive fill level measuring instruments.

In addition, many capacitive fill level measuring instruments are not able to measure at a certain fill level the capacitance value that exists between the sensor array and the reference electrode. Accordingly, how a fill level of the filler in a container is determined using such a capacitive fill level measuring instrument will now be described.

For example, assume that the fill level sensor has a hundred sensor arrays located on top of one another, that one sensor is spatially directly adjacent to a previous sensor array, and that the fill level sensor has a height corresponding exactly to the difference between the minimum height of the filler and its maximum height, so that each sensor array is responsible for exactly one percent of the difference between the minimum height of the filler and its minimum height. Under these assumption, the following applies:

If there is no filler opposite the sensor array, not even partially, the filler has the minimum possible fill level, in any case the fill level to be minimally detected. This is defined as "container empty."

If there is filler opposite the uppermost sensor array over its entire height, then filler being opposite all sensor arrays, the filler has the maximum possible fill level, but in any case reaches the fill level which is the maximum to be detected. This is defined as "container full."

If the filler, for example, reaches exactly to the upper edge of the 51st sensor array and thus exactly to the lower edge of the 52nd sensor array, the fill level is 51% of the fill level to be detected at maximum, therefore 51% of the difference between the state "container empty" and the state "container full."

If the filler reaches, for example, exactly to the middle of the 75th sensor array, the fill height is 74.5% of the fill height which is the maximum to be detected, therefore 74.5% of the difference between the state "container empty" and "container full."

Since, as stated above, such capacitive fill level measuring instruments are not used to measure at a certain fill level the capacitance value that exists between the sensor array of the fill level sensor selected by the select switch and a reference electrode, it is generally not possible, in any case not easy, to distinguish between the state "container empty" and the state "container full," because for both the state "container empty" and the state "container full" the same measured value is determined via all selectable sensor arrays and it is unknown which measured value results from a sensor array which is not opposite the filler, and which measured value results from a sensor array which is opposite the filler over its entire height.

The manufacturers of such capacitive fill level measuring instruments often do not know which fillers will be employed in their fill level measuring instruments. If, for example, a certain capacitive fill level measuring instrument is used for determining the fill level of water, the measured value of a selected sensor array which is opposite the water is "relatively large." However, if the same capacitive fill level measuring instrument is used to determine the fill level of oil, the measured value resulting from the selected sensor array which is opposite the oil is "relatively small."

SUMMARY OF THE INVENTION

Accordingly, the capacitive fill level measuring instrument of the various described embodiments at least partially eliminates the aforementioned problems with the background fill level measuring instruments.

According to one embodiment, a capacitive fill level measuring instrument is provided, including a fill level sensor having one or more sensor arrays; a select switch having a multi-pole side thereof connected to the fill level sensor; and an evaluation circuit connected to a mono-pole side of the select switch. A value corresponding to a state in which a sensor array is not connected to the evaluation circuit is measured by the evaluation circuit to determine a fill level of a container.

According to one embodiment, a capacitive fill level measuring instrument is provided, including a fill level sensor having one or more sensor arrays; first and second select switches having a multi-pole sides thereof connected to the fill level sensor; and an evaluation circuit connected to mono-pole sides of the select switches. The sensor arrays are alternately connected to the multi-pole sides of the first and second select switches.

According to one embodiment, a capacitive fill level measuring instrument is provided, including a fill level sensor having one or more sensor arrays; a select switch having a multi-pole side thereof connected to the fill level sensor; and an evaluation circuit connected to a mono-pole side of the select switch. After a first fill level determination, sensor arrays adjacent to a boundary layer are one of triggered and interrogated.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various respects, all without departing from the spirit and scope of the present invention. Accordingly, the drawings and description are to be regarded as illustrative in nature, and not as restrictive.

BRIEF DESCRIPTION OF THE DRAWINGS

The present invention is illustrated by way of example, and not by way of limitation, in the figures of the accompanying drawings, in which like reference numerals refer to similar elements, and in which.

DETAILED DESCRIPTION OF THE INVENTION

Figure 1:
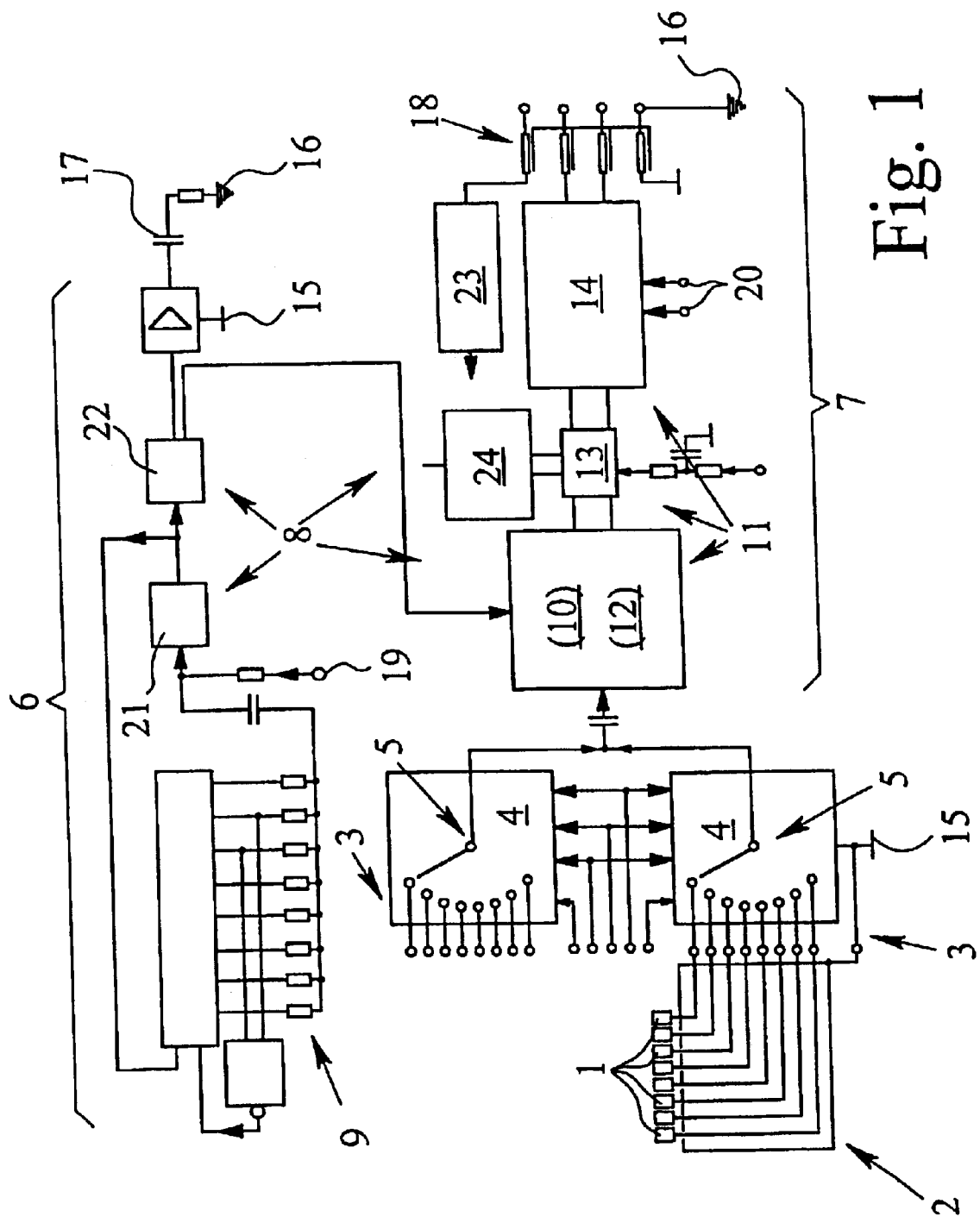
FIG. 1 is a schematic diagram of an exemplary capacitive fill level measuring instrument on which embodiments of the present invention can be practiced.
Figure 2:
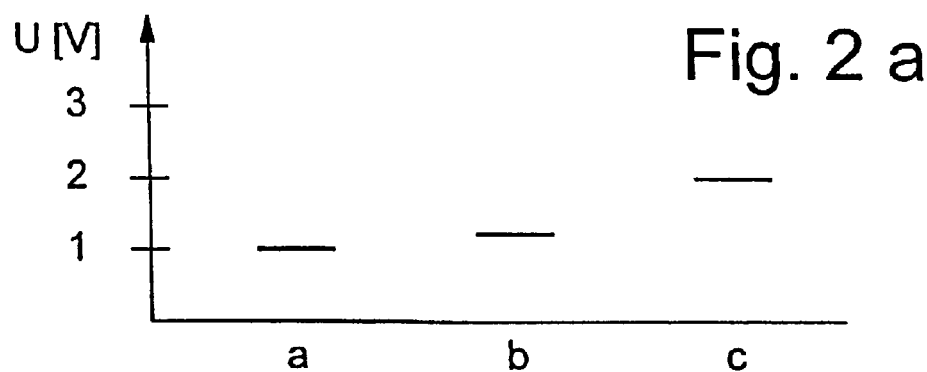
FIGS. 2a–2d are graphs of voltage values versus fill states for describing the operation of the capacitive fill level measuring instrument of FIG. 1, according to embodiments of the present invention.
Figure 2:
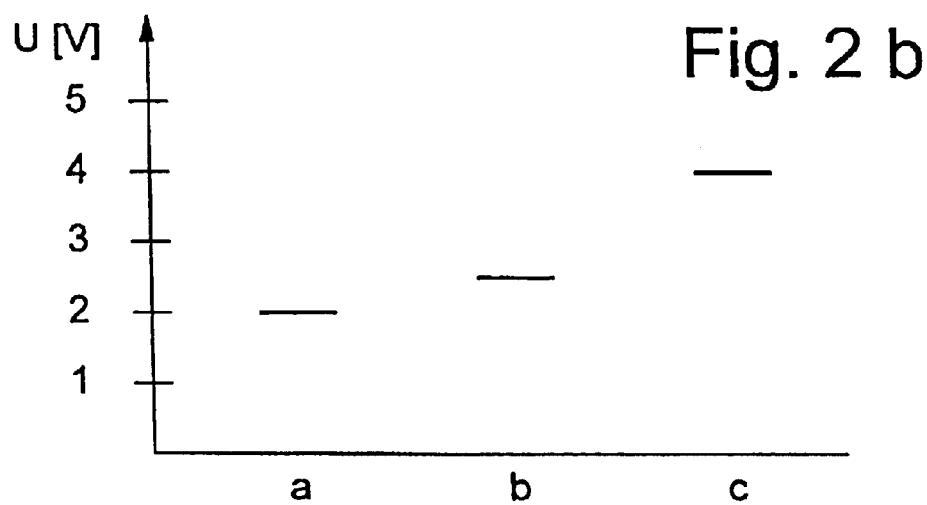
Figure 2:
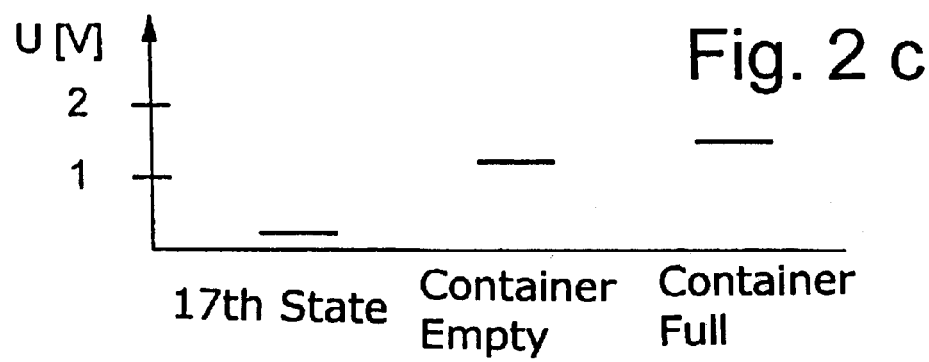
Figure 2:
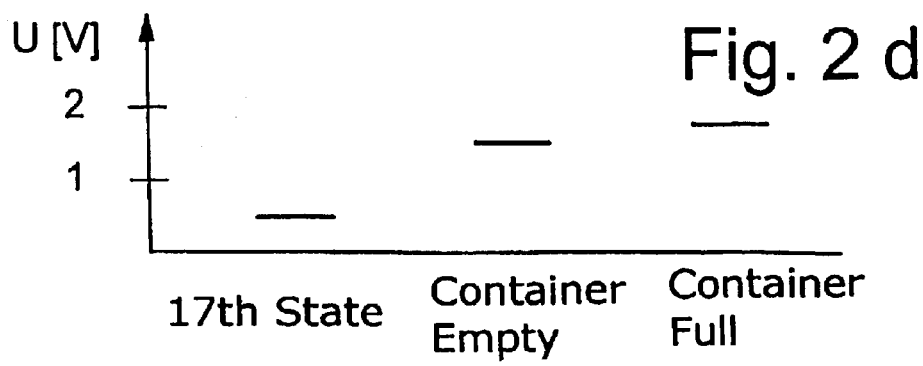

An improved capacitive fill level measuring instrument is described. In the following description, for purposes of explanation, numerous specific details are set forth in order to provide a thorough understanding of the present invention. It is apparent to one skilled in the art, however, that the present invention can be practiced without these specific details or with an equivalent arrangement. In some instances, well-known structures and devices are shown in block diagram form in order to avoid unnecessarily obscuring the present invention.

The fill level sensor measuring instrument of the present invention includes the individual sensor arrays implemented, activated, connected to the electrical lines and/or provided with electrical lines in a novel way. Specifically, the matrix, which consists of the horizontally and vertically running conductor paths, is located next to the sensor arrays, which makes it possible to accommodate a starting material for the fill level sensor that can be used for a host of different applications, and, therefore, in particular, for different types of fill level measuring instruments.

In addition, in an embodiment of the capacitive fill level measuring instrument, the power supply and evaluation circuit delivers a high frequency supply voltage, such that the power supply voltage is frequency-spread by a noise signal which originates from a noise source, leading to a frequency-spread power supply voltage, and a frequency-spread measurement value, measurement voltage or measurement current. The frequency-spread power supply voltage is placed on the first input of a correlator and the frequency-spread measurement value is placed on the second input of the correlator and the output signal of the correlator is supplied to the evaluation circuit.

In this way, interference emission or the sensitivity to incident interference is relatively low. The frequency spreading of the power supply voltage, which takes place by means of a noise signal, reduces the bandwidth and thus the spectral energy density of the power supply voltage and the measured value without the need to reduce the power supply voltage on the sensor elements. Advantageously, the amplitude of the emitted interference signals is reduced, and the maximum allowable amplitude of an interference signal emitted into the capacitive fill level measuring instrument also is increased. Thus, both interference with other devices by the capacitive fill level measuring instrument and also the sensitivity of the fill level measuring instrument to interference by other devices is reduced.

Further, in an embodiment of the capacitive fill level measuring instrument, shielding of the sensor arrays and/or the lines and/or the select switch is provided, wherein the shielding is at a potential which corresponds essentially to the potential of the sensor arrays, the lines, and the select switch, for example, as further disclosed by German patent disclosure document number 100 08 093. This measure an be used for the objective of frequency spreading discussed above, to reduce the amplitude of the emitted interference signals, and to increase the maximum allowable amplitude of an interference signal incident on the capacitive fill level measuring instrument. The frequency spreading of the power supply voltage, the frequency spreading of the measurement value, shielding, and exemplary implementations for same are further described in German patent disclosure document number 198 13 013, which is made expressly in the disclosure of the present invention.

Moreover, the embodiments of the capacitive fill level measuring instrument can incorporate features, for example, as disclosed by German patent disclosure document numbers 197 01 899, 197 44 152, 198 13 013, 199 49 998 and 100 08 093, such as:

from German patent disclosure document number 197 01 899, the so-called "charge displacement principle," also called "charge transfer sensing,"

from German patent disclosure document number 197 44 152, the "charge displacement principle" under the condition that the evaluation stage provided there is suitable for current evaluation and thus more or less no voltage excursion occurs there at the changeover contact provided there, from German patent disclosure document number 198 13 013, the previously described frequency spreading, also called "spread spectrum technique,"

from German patent disclosure document number 199 49 988, a proximity switch, especially a capacitive proximity switch, with two signal transmitters and with one signal receiver, the two signal transmitters on the one hand are connected to one another each by their first signal output and to the first signal input of the signal receiver, and on the other hand are connected each by their second signal output via one signal transmission path at a time to the second signal input of the signal receiver, and at least one of the two signal transmission paths can be influenced, or roughly what can be called "two transmitters in phase opposition" and also, as is shown, what can be used in capacitive fill level measuring instruments, and from German patent disclosure document number 100 08 093, the previously described "matrix of horizontally and vertically running conductor paths," "frequency spreading of the power supply voltage," "shielding," and other exemplary implementations.

The capacitive fill level measuring instruments described in published German Patent Application 100 08 093 work with a fill level sensor that has eight or sixteen sensor arrays. This results from the multiplexers which are used as the select switches, as they have eight or sixteen terminals on the multi-pole side. However, if fill level sensors are used that have sixteen sensor arrays, two multiplexers can be used as the select switches, with eight terminals on the multi-pole side. Advantageously, two multiplexers with eight terminals on the multi-pole side are more economical that one multiplexer with sixteen terminals on the multi-pole side (compare, published German Patent Application 100 08 093, column 11, lines 51 to 54, and FIG. 6).

It is also assumed, the fill level sensor employed has sixteen sensor arrays, the select switch therefore on its multi-pole side has sixteen terminals, and, as stated, a sixteen-pole select switch can also be implemented by two eight-pole select switches. However, various numbers of sensor arrays in the fill level sensor and various numbers of corresponding terminals on the multi-pole side of the select switch can be employed.

In the capacitive fill level measuring instrument described in published German Patent Application 100 08 093, in which the fill level sensor has sixteen sensor arrays, there are sixteen states. In the 1st state, the first sensor array is "connected" via the select switch to the power supply and evaluation circuit, in the 2nd state, the second sensor array is "connected" to the power supply and evaluation circuit via the select switch, and so forth, up to the 16th state, in which the sixteenth sensor array is "connected" via the select switch to the power supply and evaluation circuit. On this basis, the state in which no sensor array is connected to the power supply and evaluation circuit, and for which a measured value also is determined using the evaluation circuit of the power supply and the other evaluation circuit, is referred to as the 17th state.

The capacitive fill level measuring instrument of the various embodiments includes a power supply and evaluation circuit which includes a power supply circuit and an evaluation circuit. However, instead of a power supply and evaluation circuit which includes both a power supply circuit and evaluation circuit, two circuits separate from one another also can be employed. Consequently, one power supply circuit and one evaluation circuit are disclosed, regardless of whether the power supply circuit belongs to a power supply and evaluation circuit or is built by itself and regardless of whether the evaluation circuit belongs to a power supply and evaluation circuit or is built by itself.

An inventive feature of the described embodiments includes determining a measured value for the 17th state using the evaluation circuit, and can be implemented in various ways. For example, the 17th state can be implemented in that the select switch is switched to be non-conductive, for example, by being switched to be non-conductive via a control input or by being switched to be non-conductive via an operating voltage thereof. Accordingly, the select switch being switched so as to be "nonconductive," refers to no terminal of the multi-pole side of the select switch being "connected" to the mono-pole side thereof. The 17th state also can also be implemented by a state switch which is provided between the select switch and the power supply and evaluation circuit or a state switch which is provided between the select switch and the evaluation circuit being switched to be non-conductive. Finally, it is also possible to implement the 17th state by placing the connection between the select switch and the power supply and evaluation circuit or the connection between the select switch and the evaluation circuit at a fixed potential.

According to another inventive feature of the described embodiments, the measured value for the state in which no sensor arrays are influenced by the filler is controlled such that it is within a certain constant difference value above the measured value which is determined for the 17th state. This control of the measured value for the state in which no sensor arrays are influenced by the filler can take place via the gain the evaluation circuit. The control of the measured value for the state in which no sensor arrays are influenced by the filler, also can take place via the frequency of the power supply voltage, because the measured value is not only dependent on capacitance, but also on frequency.

It was also noted that capacitive fill level measuring instruments typically are not used to measure at a certain fill level the capacitance value which exists between the sensor array selected by the select switch and the reference electrode, but rather whether the filler is not opposite the sensor array selected by the select switch, not even partially, whether it is partially opposite or opposite over the entire height of the sensor array is ascertained. Accordingly, is not critical if for a certain situation there is no filler opposite the selected sensor array, there is filler opposite the selected sensor array partially, or there is filler opposite the selected sensor array over its height, because, advantageously, the resulting measured value is the same. For example, assume that:

(a) for the situation "there is no filler opposite the selected sensor array" the measured value is 1 V, (b) for the situation "the filler is opposite the selected sensor array exactly to one fourth of the height of the sensor array" the measured value is 1.25 V, and (c) for the situation "the filler is opposite the selected sensor array over its entire height" the measured value is 2 V.

Now assume that for the situations (a)–(c), for whatever reasons, other measured values arise. For example, for situation (a) a measured value of 2 V, for situation (b) a measured value of 2.5 V, and for situation (c) the measured value of 4 V arise. It applies to the two aforementioned case configurations that if before the first fill level measurement it is known that no filler is present ("container empty") or it is known that the filler is present with its maximum height ("container full"), any fill level which occurs can be measured, then later also the fill level "container empty" and the fill level "container full" can be measured. But if it is not known before the fill level measurement whether there is the situation "container empty" or the situation "container full," it cannot be easily established whether there is the situation "container empty" or the situation "container full." Proceeding from what has been assumed previously for possible measured values, specifically, at a measured value of 2 V there can be the situation "container full" (first case configuration), but their can also be the situation "container empty" (second case configuration).

For a capacitive fill level measuring instrument according to the invention, let it now be assumed that for the 17th state in the first case the measured value is 0.2 V and in the second case the measured value is 0.5 V and that for the state in which no sensor arrays are influenced by the filler, the measured value is controlled such that it is always over the measured value for the 17th state by the difference value 1 V. At this point it can be established whether the situation "container empty" or the situation "container full" is present. For the determined measured value of 0.2 V for the 17th state the situation "container empty" is present when the measured value is 1.2 V; at a larger measured value, for example at a measured value of 1.5 V, the state "container full" is present. For a determined measured value of 0.5 V for the 17th, state the situation "container empty" prevails, if the measured value is 1.5 V; for a larger measured value, for example at a measured value of 1.8 V, the state "container full" is present. Without the techniques described in the present invention, however, the measured value 1.5 V could not be assigned, because the state "container full" could be present with the state "container empty." Conversely, according to the present invention, it is possible to assign a state to the measured value 1.5 V, wherein the measured value is 1.5 V at a measured value of 0.2 V determined for the 17th state for the "container full" situation, and at a measured value of 0.5 V determined for the 17th state for the situation "container empty."

Also, the determination of the measured value for the 17th state also can be used to ascertain whether a sensor array is defective, because the measured value which results for a defective sensor array corresponds in the first approximation to the measured value which results for the 17th state.

As noted above, the capacitive fill level measuring instrument can include two select switches including multiplexers (compare published German Patent Application 100 08 093, column 11, lines 51 to 54, and FIG. 6). On this basis, the capacitive fill level measuring instrument includes the sensor arrays of the fill level sensor connected in alternation to the multi-pole side of the first select switch and the multi-pole side of the second select switch, via the electrical lines which are connected to the sensor arrays. The lowermost sensor array of the fill level sensor is called sensor array 1, the following sensor array sensor array 2, etc., consequently the uppermost sensor array, when a total of sixteen sensor arrays have been implemented, is called sensor array 16. So when the sensor arrays of the fill level sensor are connected in alternation to the multi-pole side of the first select switch and the multi-pole side of the second select switch, this can be expressed as the sensor array 1 is connected to the first terminal of the multi-pole side of the first select switch, the sensor array 2 is connected to the first terminal of the multi-pole side of the second select switch, the sensor array 3 is connected to the second terminal of the multi-pole side of the first select switch, the sensor array 4 is connected to the second terminal of the multi-pole side of the second select switch, the sensor array 15 is connected to the eighth terminal of the multi-pole side of the first select switch, and the sensor array 16 is connected to the eighth terminal of the multi-pole side of the second select switch.

In addition, the individual sensor arrays of the fill level sensor can be triggered in succession. To do this, then first the first terminal of the multi-pole side of the first select switch, then the first terminal of the multi-pole side of the second select switch, then the second terminal of the multi-pole side of the first select switch, then the second terminal of the multi-pole side of the second select switch, etc., then the eighth terminal of the multi-pole side of the first select switch, and finally the eight terminal of the multi-pole side of the second select switch are activated in succession, or explained above "connected" to the mono-pole side of the corresponding select switch.

The sensor arrays of the fill level sensor also can be triggered in phase. Therefore, a positive power supply voltage or a negative power supply voltage, which is made available by the power supply circuit, is applied to the individual sensor arrays of the fill level sensor. Conversely, the sensor arrays of the fill level sensor which are adjacent at a time are triggered in phase opposition. Accordingly, the sensor array 1 can be triggered with a positive supply voltage, the sensor array 2 an be triggered with a negative power supply voltage, etc. In this case, the individual sensor arrays of the fill level sensor also can be triggered in succession. Preferably, two adjacent sensor arrays of the fill level sensor at a time can be triggered in phase opposition at the same time, with the following advantages:

The simultaneous triggering of adjacent sensor arrays of the fill level sensor in phase opposition leads to minimal interference emissions, because the electromagnetic radiation and electromagnetic fields in phase opposition largely compensate for one another.

When adjacent sensor arrays are identically influenced by the filler, the measured values are very small (theoretically the measured value is then zero), resulting in the gain of the evaluation circuit being able to be chosen to be very large, advantageously, providing for very accurate measurements to be taken. Only in the boundary layer area, i.e., the area up to which the filler reaches, is there a noticeable measured value with which the boundary layer and thus the fill level can be established.

In the capacitive fill level measuring instrument, the fill level sensor, which implements the individual sensor arrays, generally is of a rod-shaped. It is often necessary to attach such a fill level sensor via a rod holding device, which is attached in the area between "container empty" and "container full." The above described features relating to the "17th state" and the "simultaneous triggering of adjacent sensor arrays in phase opposition," advantageously, make it easy to differentiate between the boundary layer and the rod holding device during a fill level measurement.

In the capacitive fill level measuring instrument, after a first fill level determination, only the sensor arrays of the fill level sensor which are adjacent to the boundary layer are triggered or interrogated. The formulation "adjacent sensor arrays" does not unconditionally mean only the sensor arrays directly adjacent to the boundary layer. The term "adjacent sensor arrays" can mean, for example, also two or more sensor arrays underneath the boundary layer and two or more sensor arrays above the boundary layer. Because, after a first fill level determination only the sensor arrays of the fill level sensor which are adjacent to the boundary layer are triggered or interrogated, the cycle time, and, therefore, the time for complete interrogation of all the sensor arrays to be interrogated can be greatly reduced. A relatively short cycle time is often desirable, since often the cycle time including the interrogation of all sensor arrays of the fill level sensor is too long, and, for example, in a relatively long cycle time, graphs of voltage values versus fill states of FIG. 1 can be either completely emptied or completely filled.

The present invention can be implemented so that when a fill level determination has yielded a fill level which is different from the fill level determined beforehand, the sensor arrays of the fill level sensor which are adjacent to the boundary layer which is then present are triggered or interrogated. Therefore, the sensor arrays to be interrogated are tracked to a boundary layer which changes in its height.

In addition, after a certain number of interrogation cycles (e.g., one or more), the sensor arrays of the fill level sensor can be interrogated or triggered. Advantageously, with such interrogation, it can be ascertained whether sensor arrays which are not at the time adjacent to the boundary layer, and therefore, are not actually interrogated, are defective.

Referring now to the drawings, wherein like reference numerals designate identical or corresponding parts throughout the several views, and more particularly to FIG. 1 thereof, there is illustrated a capacitive fill level measuring instrument according to one embodiment. The capacitive fill level measuring instrument of FIG. 1 provides for capacitive detection of the fill state of liquids, bulk materials, other fillers, etc., in a closed or open container (not shown). In FIG. 1, the basic structure of the fill level measuring instrument (e.g., as further described in German patent disclosure document 100 08 093) includes a fill level sensor which has several sensor arrays 1, electrical lines 2, which are connected to the sensor arrays 1 of the fill level sensor, a select switch 4, which is connected by its multi-pole side 3 to the ends of the lines 2 away from the sensor arrays 1 of the fill level sensor, and a power supply and evaluation circuit 8, which contains a power supply circuit 6 and an evaluation circuit 7, and which is connected to the monopole side 5 of the select switch 4. The sensor arrays 1 of the fill level sensor can be located on top of one another (e.g., as shown in FIGS. 1, 2, 3 and 5 of published German Patent Application 100 08 093).

The power supply circuit 6 of the power supply and evaluation circuit 8 delivers a high frequency power supply voltage, and the power supply voltage is frequency-spread, for example, by a noise signal originating from a noise source 9. The frequency-spread power supply voltage leads to a frequency-spread measured value, for example, a frequency-spread measurement voltage or a frequency-spread measurement current. The frequency-spread power supply voltage, for example, is placed on the first input of a correlator 10 and the frequency-spread measured value is placed on a second input of the correlator 10. The output signal of the correlator 10 is supplied to a further evaluation circuit.

It furthermore applies to the preferred embodiment of a capacitive fill level measuring instrument shown in FIG. 1, that shielding is applied to the sensor arrays 1 or/and the electrical lines 2 or/and the select switch 4. For example, the shielding is at a potential which essentially corresponds to the potential of the sensor arrays 1, the electrical lines 2 and the select switch 4. The connecting of the shielding via a current measurement circuit 11 to the sensor arrays 1, the electrical lines 2 and the select switch 4, results in advantages, wherein the current measurement circuit 11 employed has an almost negligibly small internal resistance. This current measurement circuit 11 can include a synchronous rectifier 12, a lowpass filter 13 connected downstream of the synchronous rectifier, and a current-voltage converter 14 connected downstream of the lowpass filter 13. In this current measurement circuit 11, the synchronous rectifier 12 and the downstream lowpass filter 13 lead to the high frequency measurement current supplied on the input side becoming a direct current which then becomes a DC voltage by means of the current-voltage converter 14.

The select switch 4 can be a multiplexer (compare, German Patent 196 44 777). In the embodiment as shown in FIG. 1, there are two select switches made as multiplexers, with eight terminals at a time being implemented on the multi-pole side 3.

Voltages can be implemented as the potential difference referenced to the frame potential or the ground potential. Conversely, in the embodiment of the capacitive fill level measuring instrument shown in FIG. 1, the power supply voltage which has been made available by the power supply circuit 6 of the power supply and evaluation circuit 8 is between the frame potential 15 and ground potential 16. Therefore, a "floating" frame potential 15 is implemented. Provisions are made for the frame potential 15 and the ground potential 16 not being shorted to one another. As is shown in FIG. 1, the power supply circuit 6 of the power supply and evaluation circuit 8 is connected to the ground potential, DC-decoupled, for example, by a decoupling capacitor 17. The evaluation circuit 7 of the power supply and evaluation circuit 8 is connected, AC-decoupled, to the ground potential 16, for example, by current-compensated interaction limiting reactors 18.

The capacitive fill level measuring instrument is usable to detect or determine the level of fillers with quite different dielectric constants and for detection and determination of the level of fillers in quite different containers. To do this, in the embodiment of the capacitive fill level measuring instrument, the frequency of the power supply voltage can be controlled by a microprocessor (not shown) via a control point 19, which can also control the gain of the evaluation circuit 7 of the power supply and evaluation circuit 8 via a control point 20.

The power supply circuit 6 of the power supply and evaluation circuit 8 includes a voltage-controlled oscillator 21 and a digital phase shifter 22, while the evaluation circuit 7 of the power supply and evaluation circuit 8 includes a voltage regulator 23 and a clamp circuit 24.

In the capacitive fill level measuring instrument, using the evaluation circuit 7 of the power supply and evaluation circuit 8, a measured value is also determined for the state in which no sensor array 1 is connected to the power supply and evaluation circuit 8, referred to as the 17th state, and which can be implemented as further described.

The measured value for the state in which none of the sensor arrays 1 are influenced by the filler is controlled such that with a certain constant difference value, for example 1 V, it is above the measured value, which is determined for the 17th state. What is achieved with the determination of a measured vale for the 17th state and with the control of the measured value for the state in which no sensor arrays 1 are influenced by the filler is explained below in conjunction with the graphic representation in FIG. 2.

First of all it is assumed as shown in FIG. 2a that:
(a) for the situation "there is no filler opposite the selected sensor array 1" the measured value is 1 V,
(b) for the situation "the filler is opposite the selected sensor array 1 up to exactly one fourth of the height of the sensor array 1" the measured value is 1.25 V, and
(c) for the situation "the filler is opposite the selected sensor array 1 over the full height of the sensor array 1" the measured value is 2 V.

It is then assumed as shown in FIG. 2b that for the situations shown above for (a), (b) and (c), for whatever reason other measured values arise. For example, for situation (a) a measured value of 2 V, for situation (b) a measured value of 2.5 V, and for situation (c) a measured value of 4 V arises.

It applies to the two aforementioned case configurations shown in FIGS. 2a and 2b that if before a first fill level measurement it is known that there is no filler ("container empty") or it is known that the filler is present with a maximum fill height ("container full"), any fill level which occurs can be measured, then later also the fill level "container empty" and "container full" can be measured. But if it is not known before the first fill level measurement whether the situation "container empty" or "container full" prevails, it cannot be easily ascertained whether the situation "container empty" or "container full" is present. At a measured value of 2 V, for example, there can be the situation "container full" (FIG. 2a), but it can also easily be the situation "container empty" (FIG. 2b).

For the capacitive fill level measuring instrument, let it now be assumed that for the 17th state in the first case (FIG. 2c) the measured value is 0.2 V and in the second case (FIG. 2d) the measured value is 0.5 V and that for the state in which no sensor arrays are influenced by the filler, the measured value is controlled such that it is always over the measured value for the 17th state by the difference value 1 V. At this point it can be established whether the situation "container empty" or the situation "container full" is present. For the determined measured value of 0.2 V for the 17th state (FIG. 2c) the situation "container empty" is present when the measured value is 1.2 V; for a larger measured value, for example at a measured value of 1.5 V, the state "container full" is present. At a determined measured value of 0.5 V for the 17th state (FIG. 2d) the situation "container empty" prevails, if the measured value is 1.5 V. For a larger measured value, for example at a measured value of 1.8 V, the state "container full" is present. Without the present invention, the measured value 1.5 V could not be assigned, i.e., the state "container full" could prevail, but there could also be the state "container empty." Conversely, the measures described in the invention make it possible to assign the measured value 1.5 V. As stated, the measured value is 1.5 V at a measured value of 0.2 V determined for the 17th state for the "container full" situation, for a measured value of 0.5 V determined for the 17th state, however, for the situation "container empty."

In the present the invention, to control the measured value for the state in which no sensor arrays 1 are influenced by the filler, such that the one with a certain constant difference value is above the measured value which has been determined for the 17th state, can be implemented differently, as further described.

In the capacitive fill level measuring instrument shown in FIG. 1, two select switches, for example, multiplexers can be used. Accordingly, the sensor arrays 1 of the fill level sensor are connected alternating to the multi-pole side 3 of the first select switch 4 and the multi-pole side 3 of the second select switch 4, for example, via the electrical lines 2, which are connected to the sensor arrays 1. Therefore, the sensor arrays 1 of the fill level sensor are connected in alternation to the multi-pole side 3 of the first select switch 4 and the multi-pole side 3 of the second select switch 4, can be expressed, for example, as the first sensor array 1 is connected to the first terminal of the multi-pole side 3 of the first select switch 4, the second sensor array 1 is connected to the first terminal of the multi-pole side 3 of the second select switch 4, the third sensor array 1 is connected to the second terminal of the multi-pole side 3 of the first select switch 4, the fourth sensor array 1 is connected to the second terminal of the multi-pole side 3 of the second select switch, etc.

The sensor arrays 1 of the fill level sensor which are adjacent at the time can be triggered in phase opposition. Therefore, the first sensor array 1 is triggered with a positive supply voltage, the second sensor array 1 is triggered with a negative power supply voltage, the third sensor array 1 is triggered with a positive supply voltage, the fourth sensor array 1 is triggered with a negative power supply voltage, etc. Preferably two adjacent sensor arrays 1 can be triggered at a time in phase opposition, as further described, for example, in conjunction with the graphic representation in FIG. 3.

Figure 3:
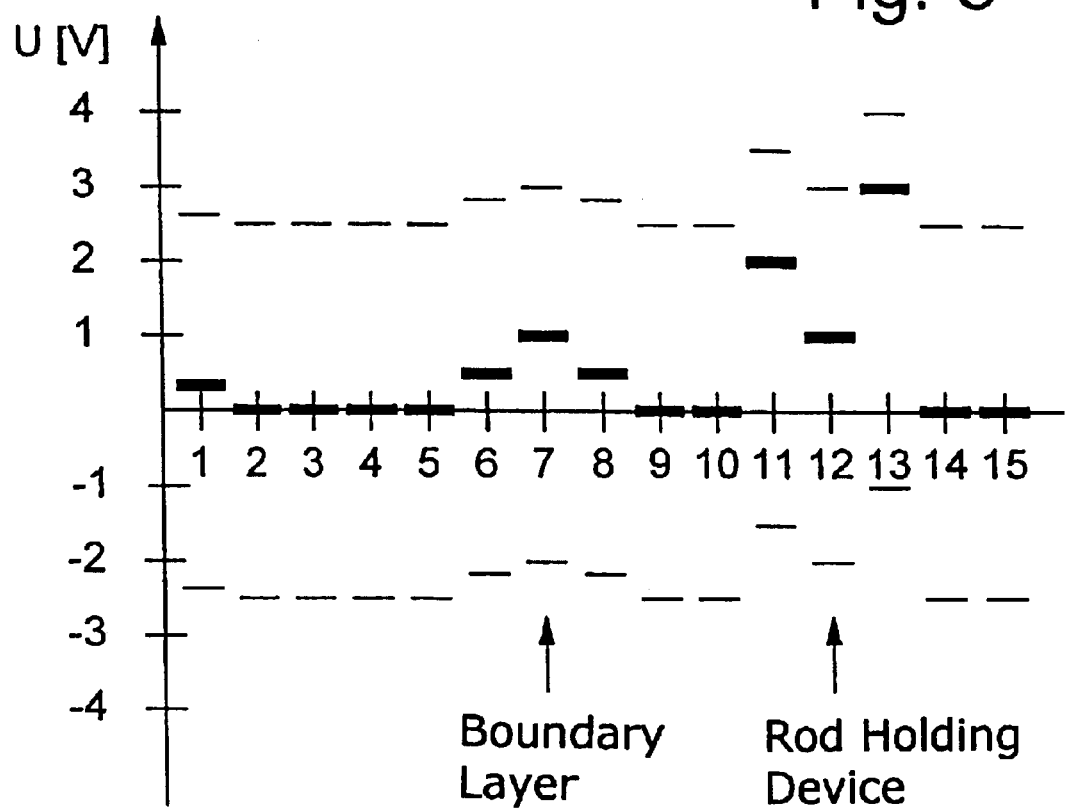
FIGS. 3 and 4 are graphs of voltage values versus sensor measurement situations for further describing the operation of the capacitive fill level measuring instrument of FIG. 1, according to further embodiments of the present invention.

The simultaneous triggering of adjacent sensor arrays 1 in phase opposition leads to very small interference emissions. However, when adjacent sensor arrays 1 are identically influenced by the filler, therefore either the filler is opposite adjacent sensor arrays or is not, the measured values are very small (theoretically then the measured value is zero), as is shown schematically in FIG. 3. In FIG. 3, the measured values for fifteen measurement situations are shown, for example, the first measured values for the first measurement situation, simultaneous triggering of the first sensor electrode 1 and the second sensor electrode 1 in phase opposition, the second measured values for the second measurement situation, for example, simultaneous triggering of the second sensor electrode 1 and the third sensor electrode 1 in phase opposition, the fifteenth measured values for the fifteenth situation, for example, simultaneous triggering of the fifteenth sensor electrode 1 and the sixteenth sensor electrode 1 in phase opposition, etc., with each measurement situation delivering one positive and open negative measured value at a time.

In FIG. 3, the respective individual measured values for the individual measurement situations are each described by thin dashed lines, and the total measured values, e.g., the sum of the individual measured values, each shown by a thick dashed lines. It is easily recognized from FIG. 3 that if adjacent sensor arrays 1 are identically influenced by the filler, the individual measured values are essentially identical in terms of their absolute values, e.g., the total measured values are therefore essentially zero, and that only in the area of the boundary layer and in the area of a rod holding device are there total measured values, which differ greatly from zero.

Figure 4:
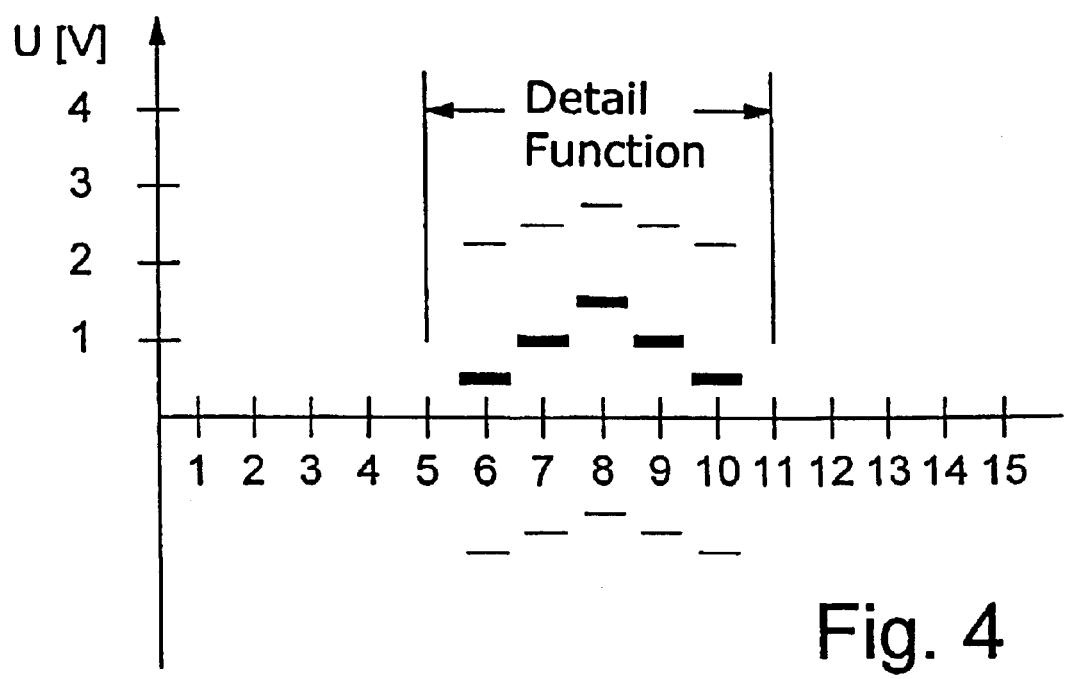

Accordingly, after a first fill level determination, the sensor arrays 1 of the fill level sensor which are adjacent to the boundary layer are triggered or interrogated. In this way, the cycle time, e.g., the time for complete interrogation of all the sensor arrays 1, which are to be interrogated, can be greatly reduced. This can be implemented such that when the fill level determination has resulted in a fill level other than the one determined beforehand, the sensor arrays 1 of the fill level sensor, which are adjacent to the boundary layer, which is then present are triggered or interrogated. Therefore, the sensor arrays 1 of the boundary layer changing in its height, which are to be interrogated, are tracked. Thus, so to speak, a detail function is implemented, which is shown schematically in FIG. 4.

The present invention is related to and claims priority from German patent application number 102 05 445.2, filed on Feb. 8, 2002, the entire contents of which is hereby incorporated by reference herein.

While the present invention has been described in connection with a number of embodiments and implementations, the present invention is not so limited but rather covers various modifications and equivalent arrangements, which fall within the purview of the appended claims.

What is claimed is:

1. A capacitive fill level measuring instrument, comprising:
   a fill level sensor having a plurality sensor arrays;
   a select switch having a multi-pole side thereof connected to the fill level sensor; and
   an evaluation circuit connected to a mono-pole side of the select switch,
   wherein a value corresponding to a disconnected sensor al-ray state, in which none of the sensor arrays is connected to the evaluation circuit, is measured by the evaluation circuit.

2. A capacitive fill level measuring instrument as claimed in claim 1, wherein the disconnected sensor array state is implemented when the select switch is in a nonconductive state.

3. A capacitive fill level measuring instrument as claimed in claim 2, wherein the select switch is switchable so as to be non-conductive via a control input thereof.

4. A capacitive fill level measuring instrument as claimed in claim 2, wherein the select switch is switchable so as to be non-conductive via an operating voltage thereof.

5. A capacitive till level measuring instrument as claimed in claim 1, wherein the disconnected sensor array state is implemented by a non-conductive state of a state switch provided between the select switch and the evaluation circuit.

6. A capacitive fill level measuring instrument as claimed in claim 1, wherein the disconnected sensor array, state is implemented when a connection between the select switch and the evaluation circuit is at a fixed potential.

7. A capacitive fill level measuring instrument as claimed in claim 1, wherein a measured value for a state in which no sensor arrays are influenced by a filler is controllable such that the measured value for the state in which no sensor arrays are influenced by the filler has a constant difference value above the measured value for the disconnected sensor array state.

8. A capacitive fill level measuring instrument as claimed in claim 7, wherein control of the measured value for the state in which no sensor arrays are influenced by the filler is based on the gain of the evaluation circuit.

9. A capacitive fill level measuring instrument as claimed in claim 7, wherein control of the measured value for the state in which no sensor arrays are influenced by the filler is based on frequency of a power supply voltage of the evaluation circuit.

10. A capacitive fill level measuring instrument, comprising:
    a fill level sensor having a plurality of sensor arrays;
    first and second select switches having a multi-pole sides thereof connected to the fill level sensor; and
    an evaluation circuit connected to mono-pole sides of the select switches,
    wherein the sensor arrays are alternately connected to the multi-pole sides of the first and second select switches, wherein the sensor arrays are adapted to be triggered in succession.

11. A capacitive fill level measuring instrument, comprising:
    a fill level sensor having a plurality of sensor arrays;
    first and second select switches having a multi-pole sides thereof connected to the fill level sensor; and
    an evaluation circuit connected to mono-pole sides of the select switches,
    wherein the sensor arrays are alternately connected to the multi-pole sides of the first and second select switches, wherein sensor arrays which are adjacent are adapted to be triggered in phase opposition.

12. A capacitive fill level measuring instrument as claimed in claim 11, wherein two adjacent sensor arrays at a time are adapted to be triggered at a same time in phase opposition.

13. A capacitive fill level measuring instrument, comprising:
    a fill level sensor having a plurality of sensor arrays;
    a select switch having a multi-pole side thereof connected to the fill level sensor; and
    an evaluation circuit connected to a mono-pole side of the select switch,
    wherein, after a first fill level determination, only sensor arrays adjacent to a boundary layer are triggered or interrogated.

14. A capacitive fill level measuring instrument as claimed in claim 13, wherein, when a fill level determination has yielded a fill level which is different from a fill level determined beforehand, the sensor arrays which are adjacent to the boundary layer are triggered or interrogated.

15. A capacitive fill level measuring instrument as claimed in claim 13, wherein, after a number of interrogation cycles, the all sensor arrays are triggered or interrogated.

16. A capacitive fill level measuring instrument as claimed in claim 1, wherein the evaluation circuit determines a fill level of the container.

* * * * *